US012326732B2

(12) United States Patent
Young et al.

(10) Patent No.: US 12,326,732 B2
(45) Date of Patent: Jun. 10, 2025

(54) GRAPH CONSTRUCTION AND EXECUTION ML TECHNIQUES

(71) Applicant: Raytheon Company, Arlington, VA (US)

(72) Inventors: Darrell L. Young, Falls Church, VA (US); Christopher A. Eccles, Ashburn, VA (US); Franklin Tanner, Ashburn, VA (US)

(73) Assignee: Raytheon Company, Arlington, VA (US)

( * ) Notice: Subject to any disclaimer, the term of this patent is extended or adjusted under 35 U.S.C. 154(b) by 661 days.

(21) Appl. No.: 17/232,818

(22) Filed: Apr. 16, 2021

(65) Prior Publication Data

US 2021/0325891 A1 Oct. 21, 2021

Related U.S. Application Data

(60) Provisional application No. 63/010,994, filed on Apr. 16, 2020.

(51) Int. Cl.
*G05D 1/00* (2024.01)
*G06F 18/20* (2023.01)
*G06N 20/00* (2019.01)

(52) U.S. Cl.
CPC ......... *G05D 1/0221* (2013.01); *G05D 1/0214* (2013.01); *G05D 1/0251* (2013.01); *G06F 18/295* (2023.01); *G06N 20/00* (2019.01)

(58) Field of Classification Search
CPC .. G05D 1/0221; G05D 1/0214; G05D 1/0251; G05D 1/0217; G06F 18/295; G06N 20/00; G06N 3/045; G06N 3/006; G06N 3/08; G06N 5/01; G06N 7/01; G01C 21/3446
See application file for complete search history.

(56) References Cited

U.S. PATENT DOCUMENTS

| | | | | |
|---|---|---|---|---|
| 10,133,275 B1* | 11/2018 | Kobilarov | ......... | B60W 60/0016 |
| 11,537,134 B1* | 12/2022 | Wiest | .................. | G06N 3/0455 |
| 11,727,345 B1* | 8/2023 | Coughran | .............. | G06N 20/00 705/338 |
| 2017/0169705 A1* | 6/2017 | Mortazavi | ........ | G08G 1/096716 |
| 2017/0323249 A1* | 11/2017 | Khasis | ................ | G08G 1/0129 |
| 2018/0267166 A1* | 9/2018 | Chen | ...................... | G01S 17/08 |

(Continued)

OTHER PUBLICATIONS

Agarwal, Akshat, et al., "Learning Transferable Cooperative Behavior in Multi-Agent Teams", arXiv:1906.01202v1, (Jun. 4, 2019), 10 pgs.

(Continued)

*Primary Examiner* — Behrang Badii
*Assistant Examiner* — Paysun Wu
(74) *Attorney, Agent, or Firm* — Schwegman Lundberg & Woessner, P.A.

(57) ABSTRACT

Discussed herein are devices, systems, and methods for autonomous, dynamic navigation of scenarios. A method can include implementing a path generation machine learning (ML) technique to determine paths between a device and a goal, determining a node of the paths as an intersection of at least two of the paths, and implementing an executive ML technique to determine which of the at least two paths to take at a node of the graph to reach the goal.

20 Claims, 9 Drawing Sheets

(56) References Cited

U.S. PATENT DOCUMENTS

2019/0316925 A1* 10/2019 Jang .................. G01C 21/3461
2020/0124429 A1*  4/2020 Zhang ................. G06Q 10/047
2020/0331465 A1* 10/2020 Herman ............... G05D 1/0276

OTHER PUBLICATIONS

Qureshi, Ahmed H., et al., "Motion Planning Networks", arXiv:1806.05767v2, (Feb. 24, 2019), 7 pgs.
Agarwal, Akshat, "Learning Transferable Cooperative Behavior in Multi-Agent Teams", arXiv:1906.01202v1, (Jun. 4, 2019), 10 pgs.
Qureshi, Ahmed H., "Motion Planning Networks", arXiv:1806.05767v2, (Feb. 24, 2019), 7 pgs.

* cited by examiner

GRAPH CONSTRUCTION AND EXECUTION ML TECHNIQUES

CROSS-REFERENCE TO RELATED APPLICATION

This patent application claims the benefit of U.S. Provisional Patent Application No. 63/010,994, filed Apr. 16, 2020, entitled "GRAPH CONSTRUCTION AND EXECUTION ML TECHNIQUES", which is incorporated by reference herein in its entirety.

TECHNICAL FIELD

Embodiments discussed herein regard devices, systems, and methods for generating a graph of a geographic region in which the graph includes executive level waypoints. Multi-agent reinforcement learning can be used to navigate the executive waypoints and motor waypoints experienced between executive waypoints. A first machine learning (ML) technique can be configured to choose the next executive waypoint to which to navigate, a second ML technique can be configured to pilot a craft through motor waypoints to the chosen executive waypoint, and a third ML technique can, while the craft is being piloted to the executive waypoint, update the graph.

BACKGROUND

A multi-agent system is a group of autonomous, interacting entities sharing a common environment, which they perceive with transducers (e.g., sensors) and upon which they act with actuators. Multi-agent systems are finding applications in a variety of domains including autonomous teams, distributed control, resource management, collaborative decision support systems, data mining, mission completion, among others Although the agents in a multi-agent system can be programmed with behaviors designed in advance, the agents often need to learn new behaviors during runtime, such that the operation of the agent or of the whole multi-agent system improves relative to some metric. This is usually because the complexity of the environment makes the a priori design of best agent operations difficult or even impossible. In an environment that changes over time, a hardwired behavior may become inappropriate or even impossible.

A reinforcement learning (RL) agent learns by interacting with its dynamic environment. At each time step, the agent perceives, by the transducer or external information, the state of the environment and takes an action. A reward signal evaluates the quality of each action, and the agent can attempt to maximize the cumulative reward along the course of interaction. The RL feedback (RL reward) is, more informative than in unsupervised learning, where there is no explicit feedback on the performance, but is less information than in supervised learning, where a proper action is provided as part of training. Well-understood, provably convergent algorithms are available for solving the single-agent RL task.

DETAILED DESCRIPTION

Figure 1:
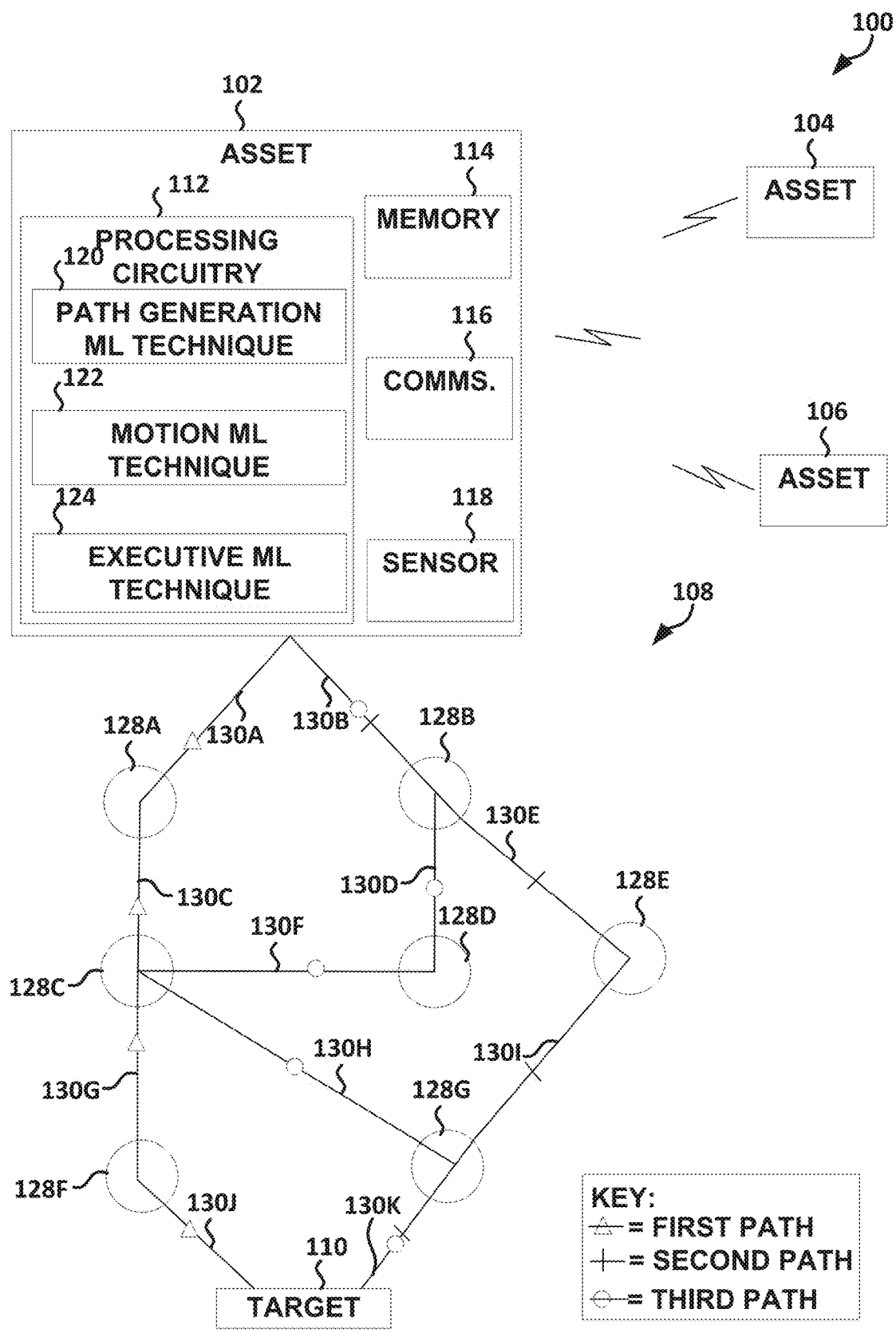
FIG. 1 illustrates, by way of example, a diagram of an embodiment of a system for improved MARL techniques.

Embodiments provide methods, systems, devices, and computer-readable media for dynamically, during runtime, updating or generating a decision graph of many possible paths to a destination or target.

A neural planner can be trained and used to generate many possible paths. Training of the neural planner can be performed using training data generated by a physics-based model of the device that implements the neural planner. The output of the neural planner is achievable paths. Intersections of the paths can form decision nodes of a graph. The nodes can represent respective decision waypoints. The graph can be populated with probabilities. The probabilities can be associated with edges and interpreted as a Markov Decision Process (MDP). The resulting MDP is much faster to train for multi-agent reinforcement learning (MARL) than non-discretized spaces. This is, at least in part, because only high-level decision waypoints are considered by the MARL technique. The techniques of embodiments are applicable to multiple domains including air, space, land, sea and cyber-physical domains.

Embodiments can harness and apply advancements in MARL for spatial-temporal domains air, land, sea, space, and cyber. Embodiments can include training of an ML technique for path generation, multi-agent training that learns cooperative behaviors using shared rewards and learned or pre-defined communication protocols, execution of learned policies in new environments, and responding to dynamic (never before seen) changes in an environment.

Multi-agent learning environments can be constructed as paths on a graph. The graph nodes are decision waypoints. Decision waypoints represent a decision as to which path to take. Decision waypoints are distinguished from motor level waypoints. Motor level waypoints denote a maneuver to navigate the environment, such as obstacle avoidance requiring a course change, navigating a turn on a chosen path, altering altitude, or the like. This hierarchical approach greatly reduces the complexity of the learning environment.

The executive level (an executive ML technique) can choose the next decision waypoint. It is up to the motor level controller (a motion ML technique) to pilot the craft through the series of motor waypoints necessary to arrive at the next decision waypoint. The executive ML technique does not need to know the details of the motion ML technique. However, the executive ML technique does need to know the performance characteristics of the agent-craft so it can make achievable plans. This is because the graph the ML technique uses to generate the graph considers the performance characteristics of the agent-craft to generate the executive level graphs. The executive level graphs with achievable decision waypoints are created using the output of a fast neural planner. This has important implications for both training and operations.

The neural planner can be created using a physics-based model. In an air realm, the physics-based model can include a 6-Degree-of-Freedom (DoF) flight simulator, such as JSBsim. The neural planner can further be created using a path planner such as A* or Rapidly Exploring Random Trees (RRT). The neural planner can be trained based on a dataset of realistic possible paths for the craft generated using the physics-based model and the path planner. The dataset can be used to train a graph generating ML technique. The dataset generation can be a one-time pre-training task. After training, the graph generating ML technique or a portion thereof, can be used as the neural path planner by the craft. The neural path planner generates realistic routes that avoid obstacles. More information on how a neural planner can replace physics-based models and route planners is provided below.

The routes can be combined to form the network graph. The nodes in the graph can be auto-annotated to convert the graph into a Markov Decision Process (MDP) for input into MARL techniques.

FIG. 1 illustrates, by way of example, a diagram of an embodiment of a system 100 for improved MARL techniques. The system 100 as illustrated includes assets 102, 104, 106, a graph 108, and a target 110.

The assets 102, 104, 106 can include one or more crafts (devices capable of moving within their environment), one or more stationary devices (devices not capable of moving within their environment), or a combination thereof. The crafts can include vehicles capable of motion in air, on land, in or on water, a combination thereof, or the like. Examples of crafts include cars, trucks, motorcycles, planes, trains, helicopters, drones, boats, aircraft carriers, submarines, satellites, intelligence, surveillance, and reconnaissance (ISR) devices, or the like. Stationary devices can include computing or network devices, such as routers, access points, laptops, desktops, phones, radios (e.g., satellite, cellular, transmit, receive, or transceiver radios, or the like), firewalls, base stations, communication towers, repeaters, ISR devices, or the like.

The assets 102, 104, 106 can cooperate with each other to achieve a goal. The goal can include destroying, incapacitating, damaging, or neutralizing the target 110. The assets 102, 104, 106 can use MARL in achieving the goal.

The asset 102 as illustrated includes processing circuitry 112, memory 114, communications circuitry 116, and one or more sensors 118. The assets 104, 106 can include same or similar components to the processing circuitry 112 with the ML techniques of the assets 104, 106 trained based on a different model if the asset 104, 106 is a different type or model from the asset 102.

The processing circuitry 112 can include electric or electronic components configured to manage operation of the asset, such as by implementing an ML technique, such as a path generation ML technique 120, a motion ML technique 122, an executive ML technique 126, or a MARL technique. The electric or electronic components can include one or more resistors, transistors, capacitors, diodes, inductors, logic gates (e.g., AND, OR, XOR, negate, or the like), multiplexers, switches, power devices, regulators, analog to digital converters, digital to analog converters, processing units (e.g., a central processing unit (CPU), an application specific integrated circuit (ASIC), a field programmable gate array (FPGA), a graphics processing unit (GPU), or the like), oscillators, or the like.

The path generation ML technique 120 can be trained based on a dataset generated using a physics-based model of the asset 102. The dataset can be generated using, additionally, a path generator. A physics-based model can be generated using design of experiments (DOE) or alternatives thereof. The physics-based model describes the capabilities of the asset 102 in mathematical terms. The path planner finds continuous paths between the asset 102 and the target 110 in free space. The path planner can be informed by a map of the environment between and/or around the asset 102 and the target 110. The physics-based model can provide constraints on the path planner. The constraints can limit the paths generated by the path planner to only those paths that are feasible for the asset 102 to navigate. The map of the environment can similarly provide constraints (in the form of obstacles) on the path planner. For example, a mountain without a road going therethrough can provide an insurmountable constraint for many land and water vehicles. The same mountain can provide a surmountable constraint for an air vehicle. The path planner can, base on the physics-based model, determine whether the obstacle is surmountable or insurmountable.

The path generation ML technique 120 can include a neural planner. Neural planners are discussed in more detail elsewhere herein.

The motion ML technique 122 can operate to maneuver the asset 102 to between waypoints of the graph 108. The motion ML technique 122 can be trained in a supervised or semi-supervised manner using data from the physics-based model, the sensor 118, the communications circuitry 116, or the like.

The motion ML technique 122, path generation ML technique 120, and executive ML technique 124 can be trained using a variety of training examples. Different types of training examples can provide different types of output from the motion ML techniques. For example, training the ML technique with example routes that minimize fuel gives one kind of ML technique. Training with examples that minimize time of transit gives another. The ML techniques can also be trained with example routes that minimize risk.

After deployment, the ML technique input can include the starting and desired ending point, goal, or target. An additional motion ML technique input can include one or more environmental obstacles represented as 3D point clouds. The density of the 3D point cloud can correspond to the risk or danger of an obstacle. Fixed obstacles, such as mountains and other vertical obstructions, are of such high density that the survivability of the craft is instantly compromised when encountering them. Weather obstacles are represented are time varying 3D risk point clouds of varying density, such that the craft's accumulated hazard increases when traversing through more dangerous regions. Man-made threats such as surface-to-air missile (SAM) can include associated threat domes that can be represented as 3D risk point clouds proportional to the probability of damage they can inflict. The risk of a collision with another aircraft can be represented as a preferred flight corridor with low risk density. For automotive domain the risk of collision can be represented as a preferred corridor in a proper lanes.

The accumulated hazard of a route can be used as a decision input along with other resource constraints (see FIGS. 3 and 4 among others) such as the fuel, and time in the decision graph. The accumulated hazard can be used to compute the probability of survival. If the craft survives, the accumulated hazard can be reset and the craft can continue by choosing the next executive waypoint. If the survivability computation indicates the craft did not survive, the journey can be terminated for that craft, however, other assets operating on the decision node graph can continue. The output of the executive ML technique 122 can be a route from the input starting position to the desired goal (a next executive waypoint), which minimizes or is otherwise based on one or more resource constraints.

A variety of routes can be constructed by selecting different types of pre-trained ML techniques. For a given ML technique, a variety of routes can be constructed by first finding the route which minimizes the selected resource (e.g. fuel, time, or risk) and then blocking that route and using the selected ML technique again to find an alternative route, and so forth. Many of these routes can share common parts and many of the different routes can intersect. The resulting decision graph provides the information needed to find the best path that simultaneously meets multiple-objectives and constraints.

The executive ML technique 124 can include MARL. MARL is described in further detail in the Background. MARL can include training each asset 102, 104, 106 to learn its operating policy. After training, the asset 102, 104, 106 can execute, via the processing circuitry 112 the learned policy at every decision waypoint in real time. If the training encompasses sufficient diversity, the policy learns to generalize to make correct decisions on never-before-seen situations. The path generation ML technique 120 allows rapid construction of the new decision and motion waypoints based on changing conditions as described below.

The memory 114 can include data used to implement the path generation ML technique 120, motion ML technique 122, and executive ML technique 124. The memory 114 can include instructions that, when executed by the processing circuitry 112 cause the processing circuitry 112 to implement operations of the ML technique 120, 122, 124.

The communications circuitry 116 can include one or more electric or electronic components configured to communicate data between the assets 102, 104, 106. The communications circuitry 116 can include one or more radios (e.g., transmit, receive, or a combination thereof), antennas, modulators, demodulators, phase-locked loops, oscillators, amplifiers, transistors, resistors, capacitors, diodes, inductors, or the like. The communications circuitry 116 can be configured to transmit data to or receive data from the asset 104, 106. The communications circuitry 116 can be configured to provide data indicating a respective reward of a decision by the executive ML technique 124. The communications circuitry 116 can be configured to provide data from the sensor 118 to the asset 104, 106 or receive data from a sensor of the asset 104, 106.

The sensor 118 can measure a physical property of a surrounding environment. Data representing a measurement of the physical property can be stored in the memory 114. The sensor 118 can include an infrared sensor, a capacitance sensor, a moisture sensor, a temperature sensor, a gas sensor, an ultrasonic sensor, a color sensor, a proximity sensor, light dependent resistor (LDR) sensor, accelerometer, pressure sensor, optical sensor, smoke sensor, alcohol sensor, touch sensor, tilt sensor, flow sensor, level sensor, other sensor, or the like.

The graph 108 can include paths between the asset 102 and the target 110. Intersections between the paths are represented as nodes 128A, 128B, 128C, 128D, 128E, 128F, 128G. Portions of the paths between, to, or from nodes 128A-128G are represented as edges 130A, 130B, 130C, 130D, 130E, 130F, 130G, 130H, 130I, 130J, 130K. The paths in the example of FIG. 1 can be summarized as compilations of edges as follows:

First path: edge 130A, edge 130C, edge 130G, edge 130J;
Second path: edge 130B, edge 130E, edge 130I, edge 130K;
Third path: edge 130B, edge 130D, edge 130F, edge 130H, edge 130K.

The graph 108 can be generated by the path generation technique 120. The graph 108 can be updated by the path generation technique. The update can be performed in response to receiving data from the sensor 118, the asset 104, 106 (e.g., through the communications circuitry 116), or the like. That is, the data from the sensor 118 or the asset 104, 106 can be used as input to the path generation ML technique 120.

Not all data requires an update to the graph 108. The data that might inform an update to the graph 108 can be determined by the processing circuitry 112. Data representing conditions that lead to an immediate update on the paths can be new and dangerous obstacles, such as severe weather, or another new threat. The update can be achieved by representing the new threat obstacle as a 3D risk point cloud and invoking the path generation ML technique 120, which rapidly generate a variety of routes around the new obstacle. The intersections of the new routes can be converted into an updated decision graph. The pre-trained assets can then select the best new route to avoid the threat.

Each of the assets 104, 106 can include components similar to the asset 102 with the ML techniques 120, 122, 124 trained specifically for the asset 104, 106. Each of the assets 102, 104, 106 can thus have different graphs that represent their paths to a same or different target. The assets 102, 104, 106 can cooperate to collectively destroy, move to, neutralize, or perform a specific action on respective targets. To do this, rewards from performing the respective executive ML technique can be shared between the assets 102, 104, 106 and used as feedback or input to the executive ML technique, such as to inform a next decision by the executive ML technique.

Figure 2:
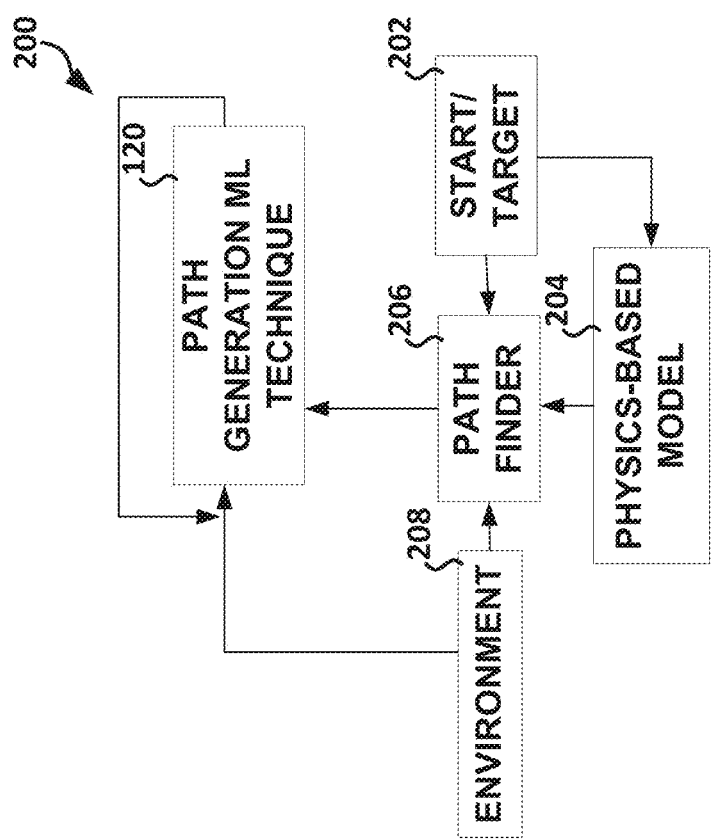
FIG. 2 illustrates, by way of example, a diagram of an embodiment of a technique for training the path generation ML technique 120.

FIG. 2 illustrates, by way of example, a diagram of an embodiment of a technique 200 for training the path generation ML technique 120. The technique 200 as illustrated includes defining a starting location and the target 110, at operation 202. The starting location can be a location in space (e.g., on, above, or below the Earth's surface). The starting location can be defined in Global Positioning System (GPS) coordinates, Universal Transverse Mercator (UTM) coordinates, universal X, Y, Z coordinates, or the like. The target 110 can specify an entity, object, location, or the like at which the asset 102, 104, 106 is to perform an operation. Start location and the target 110 can be provided to the physics-based model 204 and the path finder 206.

The physics-based model 204 can uses equations defining achievable motions of the asset 102, 104, 106 within the constraints of the asset 102, 104, 106. The possible motion of the asset 102, 104, 106 can be informed by the starting location or the target defined at operation 202. The equations governing the motion of the asset can depend on many physical factors. Aeronautical vehicle motion, for example, depends on factors such as available thrust, drag, center-of-gravity, and size, shape, and characteristics of control surfaces. The path generation ML technique 120 can use examples from the physics-based model to mimic the same type of route. An advantage of the path generation ML technique 120 can be its speed of execution relative to the physics-based-model.

The environment 208 is the terrain and objects (e.g., other assets and threats) between the starting location and target 110. The environment 208 can include a three-dimensional (3D) model of the terrain and objects between the starting location and target 110. The environment 208 can include information from ISR devices that are gathering information regarding the starting location, the target 110, and the area therebetween and/or therearound.

The path finder 206 can determine possible paths between the starting location and the target 110 as constrained by the physics-based model 204, the starting location, the target 110, and the environment 208.

The path generation ML technique 120 can be trained in a supervised manner using the paths from the path finder 206, intersections between the paths, the environment 208, and labels indicating the path to be chosen. In this way, the path generation ML technique 120 can inherently learn the constraints of the asset 102, 104, 106 without having to operate the physics-based model 204.

Figure 3:
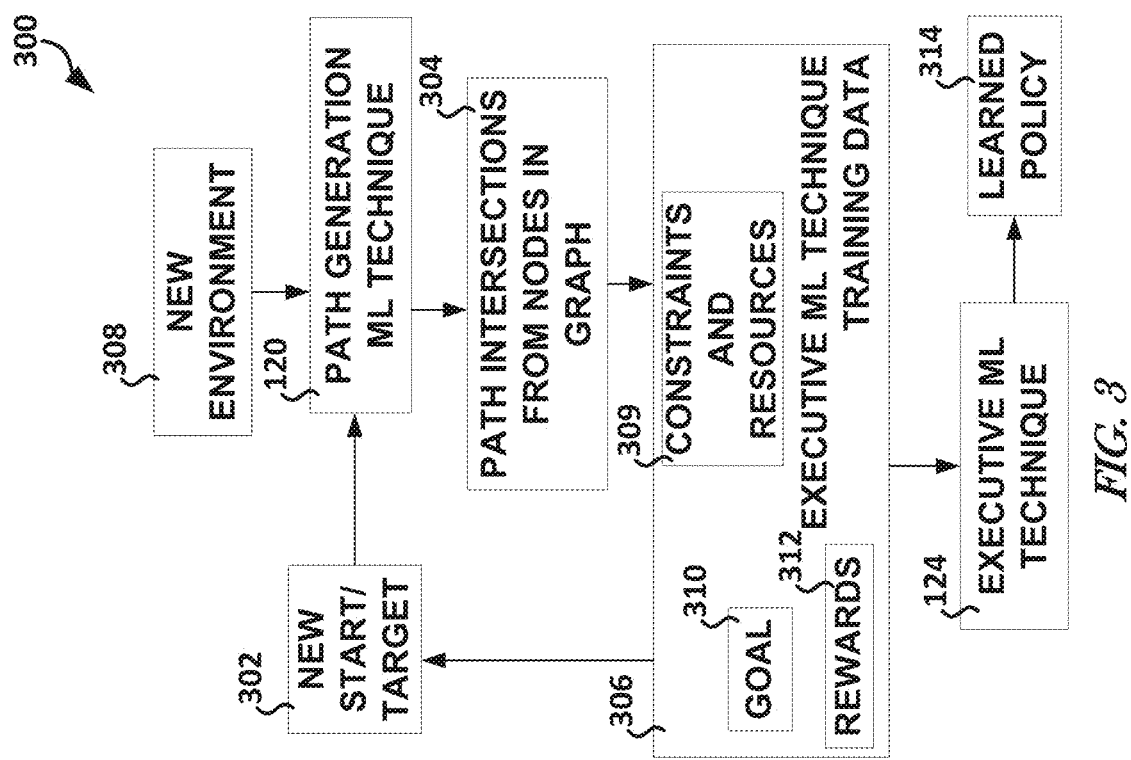
FIG. 3 illustrates, by way of example, a diagram of an embodiment of a technique for training the executive ML technique.

FIG. 3 illustrates, by way of example, a diagram of an embodiment of a technique 300 for training the executive ML technique 124. The technique 300 as illustrated includes providing a new starting location and/or target 110, at operation 302, to the path generation ML technique 120 (e.g., trained according to the technique 200). The technique 300 as illustrated includes providing a new environment 308 to the path generation ML technique 120. The path generation ML technique 120 can generate the graph 108 that details paths from the starting location to the target 110. The graph 108 can include path intersections as nodes 128A-128G. The asset 102, 104, 106, can operate the executive ML technique 124 at or near a node 128A-128G to determine the next node 128A-128G to which to travel. The path intersections (the nodes 128A-128G) in the graph 108 can be provided as executive ML technique training data 306.

The executive ML technique training data 306 can further include a goal 310, constraints and resources 309 available to the asset 102, 104, 106, and rewards 312 from a last decision made by all of the assets 102, 104, 106 cooperating to satisfy the goal 310.

The goal 310 can include one or more specific targets 110, one or more operations to be completed at the target 110, or the like. The goal 310 can be the same for all the assets 102, 104, 106 that are cooperating. The assets 102, 104, 106 can be trained simultaneously, such as to train the rewards 312 for the decisions. The rewards 312 can be communicated (by the communication circuitry 116), to all other assets 102, 104, 106, such as to provide feedback on execution of the goal 310.

The constraints and resources 309 can include paths (represented by edges 130A-130K) between nodes 128A-128G, limitations of assets 102, 104, 106, assignment of a portion of the goal 310 to one or more assets 102, 104, 106, prohibition of an asset 102, 104, 106 from performing an operation or a portion of the goal 310, an intermediate location or operation on the way to performing the goal (per asset 102, 104, 106), a threat (e.g., with a location, threat radius, or a combination thereof) present in the new environment 308, or the like. The executive ML technique 124 can be trained using the executive ML technique training data 306.

In performing the executive ML technique 124, a reward can be generated. The reward 312 is an indication of the effectiveness of the decision in furthering completion of the goal 310. The reward 312 for each of the assets can be provided to the assets 102, 104, 106 as data to be used at the next decision point. The executive ML technique 124 can generate a learned policy 314. The learned policy 314 is a function that receives input data, and generates a next node, given a choice of nodes. The learned policy 314 is what is implemented by the executive ML technique 124 during execution time.

Figure 4:
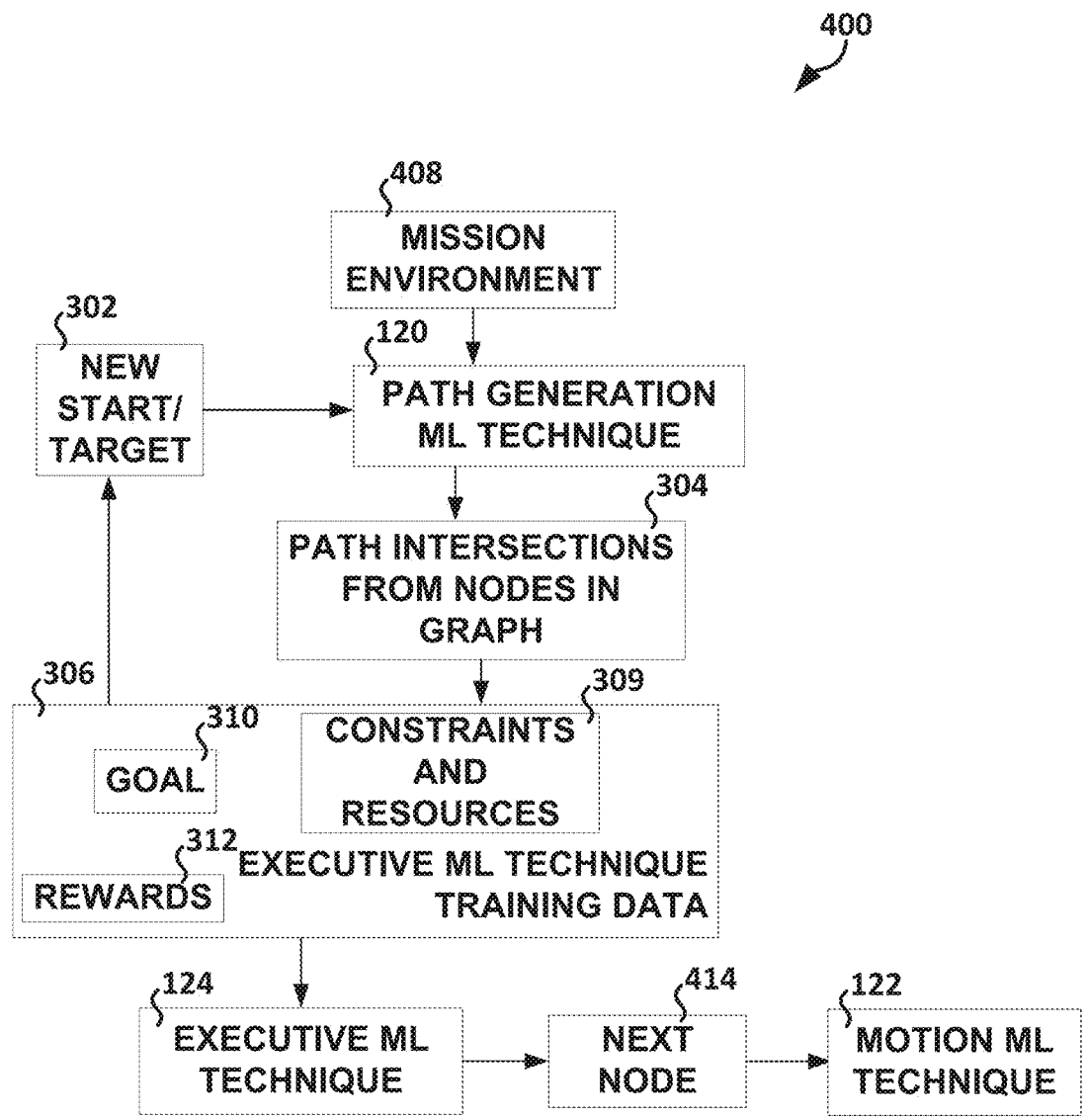
FIG. 4 illustrates, by way of example, a diagram of an embodiment of a technique for executive ML technique execution during runtime.

FIG. 4 illustrates, by way of example, a diagram of an embodiment of a technique 400 for executive ML technique 124 execution during runtime. The technique 400 is similar to the technique 300, as MARL is a reinforcement technique. Data similar to that used in training is used in execution to inform the executive ML technique 124 how it is progressing to achieve the goal 310. A difference between the technique 400 and the technique 300 can include the environment 408 being the mission execution environment and different from the environment 308 used to train the executive ML technique 124. Another difference between the technique 400 and the technique 300 can include a next node 414 (determined by the executive ML technique 124) being provided as input to the motion ML technique 122. The motion ML technique 122 can then determine how to maneuver the asset 102, 104, 106 to the node 128A-128G indicated by the next node 414.

The system 100 and techniques 200, 300, 400, as previously discussed can be used in air, land, water, cyber, a combination thereof; or the like. In air, command and control (C2) air planning supports a variety of military and civil missions such as ISR; Search and Rescue Operations (SAR), combat strike, escort, transport, refueling, demining operations, border patrol, surveillance of smuggling operations, interdiction operations, disaster management, forest fire detection, and traffic monitoring. In all of these use cases, Air Traffic Control (ATC) provides guidance. The ATC operators face the challenging problem of creating optimal plans to meet mission goals, satisfy constraints, and minimize risk in real-time, and in response to changing conditions. The system 100 and techniques 200, 300, 400 for MARL can rapidly generate candidate plans for ATC operator approval.

MARL can require substantial training for each asset 102, 104, 106 to learn its optimal policy. That is, the techniques 200 and 300 can require considerable data and time. After training, the asset 102, 104, 106 can execute the executive ML technique 124 based on the learned policy 314, at every node 128, such as in real time. If the training includes sufficient diversity, the asset 102, 104, 106 learns to generalize to make correct decisions on never-before-seen situations. The path generation ML technique 120 allows rapid construction of the new decision and motor waypoints based on changing conditions.

Consider the graph 108 in FIG. 1 and assume the asset 102 is an aircraft tasked with reaching the target 110. Then, during mission operation, a new obstacle is detected. The obstacle can be detected by a sensor 118 of an asset 102, 104, 106 or an ISR device supporting the assets 102, 104, 106. The path generation ML technique 120 can be executed with additional data that augments the environment 408 to generate a new graph.

Figure 5:
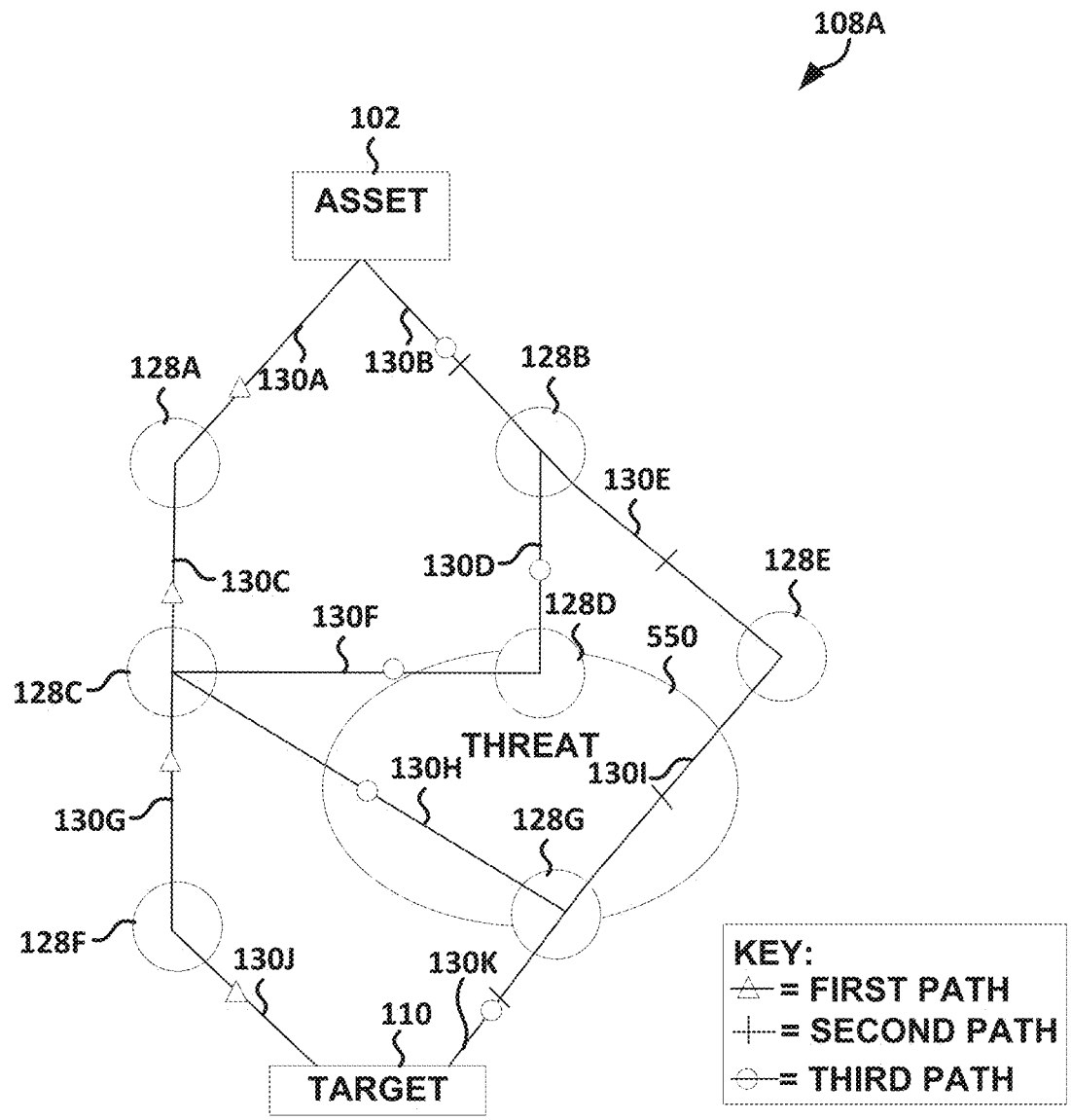
FIG. 5 illustrates, by way of example, a diagram of an embodiment of a new graph generated in consideration of the obstacle data.

FIG. 5 illustrates, by way of example, a diagram of an embodiment of a new graph 108A generated in consideration of the obstacle data. The new graph includes the obstacle 550 and allows the executive ML technique 124 to determine whether to alter course based on the obstacle 550. In some embodiments, the obstacle 550 can be a target 110 and become a part of the goal 310. In such embodiments, the executive ML technique 124 can operate based on an updated goal 310 to determine the next node 414. In some embodiments, the new data can regard another asset rather than a target or obstacle. In such embodiments, the asset can become part of the MARL and the reward 312 from the new asset can be considered by the executive ML technique 124.

Path finding, such as by the path finder 206, to find a route to the target 110, while avoiding obstacles has been researched previously. Path finding techniques can be classified as grid-based, like A* which has time complexity of at least O(n), or Sampling-Based Planning, like RRT is at least O(n log n) where n is the size of a 2D search space of size n×n. Additional factors influence the time complexity of existing techniques. A neural network path finding technique can produce a near optimal solution in O(1) regardless of the search space size. This can be particularly important when path finding in higher-dimensional spaces. 3D path finding with A* is much more computationally complex than O(n), yet the neural path finding approach remains O(1). The speed-up using the neural net enables paths and decision waypoints (e.g., nodes 128) to be generated online during training. More importantly, post-training, it enables rapid re-planning in dynamic situations where the environment has changed.

Isolating the executive multi-agent reinforcement learning (MARL) from motion functions or to just decision waypoints increases speed of simulation and allows much faster training time. For example, a continuous, physics-based, motor level MARL for aircrafts requires the update of a 6 Degree-of-Freedom (DOF) simulation at least 20-times per flight second at a nominal cost of 5-ms each on a typical personal computer. Reducing the frequency of updates can result in inaccurate trajectories because the integrated equation-of-motion updates depend on the last state. Simulation of a single 1000 km flight path at a speed of 200 knots would require the 6-DOF model to simulate 2.7 hours of flight time at 20 Hz for 194,400 6-DOF updates, which, at the nominal cost of 5-ms each, takes 972 seconds of CPU time. In comparison, the computation required to evaluate the decision waypoints is trivial. The decision waypoints are found by using the path generation ML technique 120 (sometimes called a neural planner when the path generation ML technique 120 is implements using a neural network). The neural planner is O(1) complexity. The neural planner performs two functions: 1) replaces the 6-DOF physics-based model (during execution); and 2) replaces the path-finding technique (during execution) to avoid obstacles.

Assume a multi-agent goal is to minimize a total distance traveled by all assets. Enumerating all possible outcomes and tallying the total distance for each combination of choices can be done for this simple example in less than a few nanoseconds, which is considerably faster than simulating the flight paths; however, the complete enumeration approach quickly becomes intractable when the number of agents and goals increases. For a symmetric case when the number of agents and goals equals m, the complexity for enumeration method grows as m factorial. For a modest size of m=10, m!=3628800. Assuming each operation can be evaluated in one clock cycle on a 3 GHz machine, the enumerated solution can be found in 1.2 milliseconds.

However, a slight increase in the number of agents and goals from 10 to 15 increases the number of required enumerated evaluations to 1.31e+12, which at the 3 GHz evaluation rate would require 7.26 hours to complete. A further increase in number of agents (e.g., assets 102, 104, 106) results in dramatic number of enumerations due to the combinatorial explosion of the factorial. For example, just increasing the number of agents and goals to 26 would require 4.26 billion years to enumerate which is greater than the remaining expected lifetime of the sun. Combinatorial explosion of the policy search space is the reason centralized MARL has proven to be so computationally expensive. A solution proposed by embodiments is independent learners which also learn what, when, and how to communicate with the other agents and the environment.

Fortunately, a technique known as the Hungarian algorithm, reduces the complexity for the bipartite graph assignment problem to $n^3$, which enables rapid computation of the optimal solution of the agent-to-goal pairing problem. Agarwal, in Agarwal, A., Kumar, S. and Sycara, K., "Learning transferable cooperative behavior in multi-agent teams," arXiv preprint arXiv:1906.01202 (2019) uses the Hungarian algorithm to compute the negative of the clipped mean distance of a geospatial goal to its closest agent, as a shared reward function for the team. This incentivizes the team to cooperatively cover all geospatial goals. Agarwal does not assign particular landmarks to each agent, as is the standard practice in the swarm robotics literature, but instead, the agents communicate with each other and develop a consensus about which agent will cover which landmark. The shared reward function can be modified to include additional objectives and constraints.

Modifying the shared reward function can allow modeling of important factors, such as limited amount of available fuel, and multi-objectives, such as minimizing the time to reach high priority targets while simultaneously minimizing risk. The operations research approach, Multi-Objective Mixed Integer Linear Programming (MILP) has been used to account for multiple objectives while meeting constraints. MILP requires skill in formulating the problem and considerable compute resources to solve. Embodiments, in contrast, use cooperative MARL derived policies, which can optimize multi-objective goals, while satisfying constraints as a replacement for MILP solutions. This allows the trained agents to better respond to dynamic changing conditions.

Figure 6:
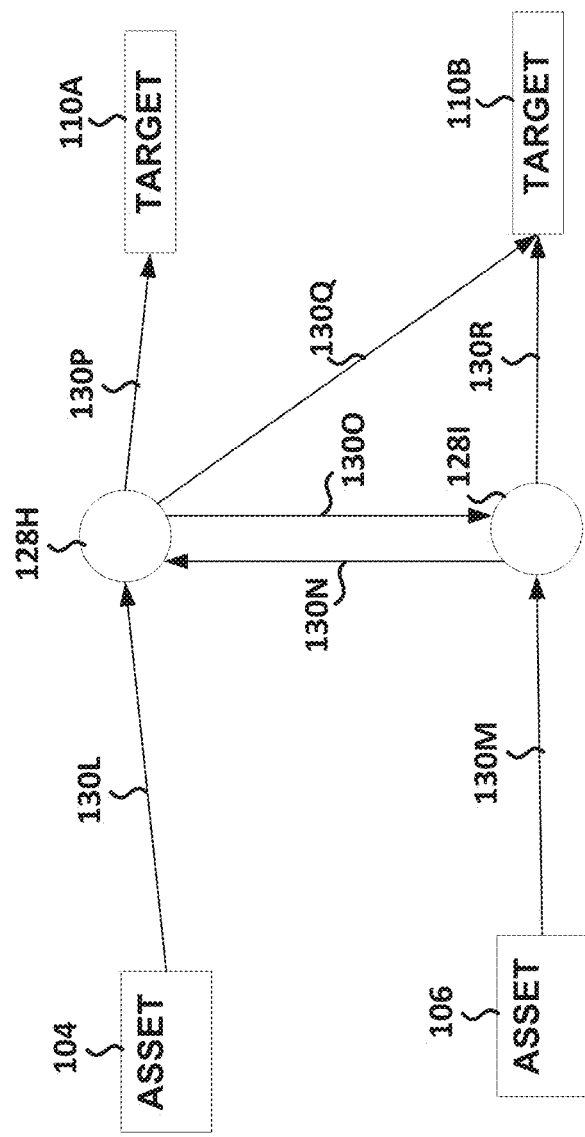
FIG. 6 illustrates, by way of example, a diagram of an embodiment of an MDP with unknown transition probabilities for a simple two-asset, two-target bipartite graph assignment problem.

FIG. 6 illustrates, by way of example, a diagram of an embodiment of an MDP with unknown transition probabilities for a simple two-asset 104, 106, two-target 110A, 110B bipartite graph assignment problem. Finding an optimal policy for the transitions (represented by edged 130L, 130M, 130N, 130O, 130P, 130Q, 130R) between nodes 128H, 128I depends on the state of the assets 104, 106 and the rewards 312. The MDP can be defined by a tuple (S, A, P, r, $p_o$, γ) where S is a finite set of states, A is a finite set of actions, P: S×A×S→$\Re$ is the state transition probability distribution, r:S→$\Re$ is the reward function, $p_o$: S→$\Re$ is the probability distribution over the asset's initial state $s_o$ and γ is the discount factor which determines how much the asset 104, 106 values immediate rewards over future rewards. The future state depends only on the present state, not on the sequence of events that preceded it, i.e., $p(s_{t+1}|s_t, a_t, \ldots, s_o, a_o) = p(s_{t+1}|s_t, a_t)$.

The policy is a distribution from states to actions $\pi$: $S \times A \to [0,1]$ which encodes the asset's probability of taking each action in each state. Under policy $\pi$, the state value function $V_\pi: S \to \Re$, action value function $Q_\pi: S \times A \to \Re$ and advantage function $A_\pi(s_t, a_t)$ are defined as:

$$Q_\pi(s_t, a_t) = \mathbb{E}_{s_{t+1}, a_{t+1}} \ldots \Sigma_{k=0}^{\infty} \gamma^k r(s_{t+k})$$

$$V_\pi(s_t) = \mathbb{E}_{a_t, s_{t+1}, a_{t+1}} \ldots \Sigma_{k=0}^{\infty} \gamma^k r(s_{t+k})$$

$$A_\pi(s_t, a_t) = Q_\pi(s_t, a_t) - V_\pi(s_t)$$

where $a_t \sim \pi(a|s_t)$, $s_{t+1} \sim p(s_{t+1}|s_t, a_t)$, and the subscripts t; t+1 etc. refer to time.

From the perspective of any one asset 104, 106, the other assets 104, 106 are also learning. This makes the environment non-stationary, which in turn requires the asset 104, 106 to adapt its own evolving behavior to the other asset 106, 104, leading to a reward 312 only if all the assets' behaviors converge to produce a meaningful interaction.

Both the joint action and state space of the assets 104, 106 grow combinatorically in the number of assets, making it difficult for single-agent reinforcement learning (RL) to scale up to a large number of assets. The decentralized MARL solutions of embodiments are scalable because each asset 104, 106 learns the information needed from other asset 104, 106 and learns information from the environment needed for the asset 104, 106 to take action to improve the advancement all cooperating assets 104, 106 towards the overall objective, the targets 110A, 110B in the example of FIG. 6.

The standard single-agent RL setting assumes that a single asset acts on the environment, and has to, by definition, treat other assets as part of the environment. Multi-agent environments can be modeled as a Markov (or stochastic) game, which is a generalization of MDPs to the multi-agent setting. In the fully cooperative case, this formulation is consistent with the decentralized partially observable MDPs (Dec-POMDP) formulation.

A Markov game can be defined by a tuple (S, A, P, r, M, Z, O) where M is the number of agents, S is the set of states, P: $S \times A \times S \to [0; 1]$ is the state transition probability function. At each time step, each asset 104, 106 can choose an action $a^i \in A$, to create a joint action $a \in A$, and receives an immediate reward 312 from the environment $r^i(s, a): S \times A \to \Re$, along with an observation $z^i \in Z$, according to observation function O(s, a): $S \times A \to Z$. Each asset's policy 314 $\pi^i$ can be conditioned on its history of observations and actions, $h^i \in H \in (Z \times A)$. In fully cooperative games, all the assets can share the same reward function and discount factor. The shared reward function can reinforce the desired cooperative behaviors.

The next discussion distinguishes embodiments and highlight improvements of embodiments over prior RL techniques.

Centralized RL

In centralized RL all the assets 102, 104, 106 communicate to a central "hive" mind, which makes a collective decision about what action each asset 102, 104, 106 should take. From a learning perspective, the hive mind is essentially a single asset. This approach can be very powerful. However, the hive-mind approach is difficult to scale, at least in part because the combinatorial complexity of the policy search space as more assets are added. Another downside of the centralized approach is its fragility. Any event that impacts the central controller's ability to command the assets 102, 104, 106 renders all the assets 102, 104, 106 useless.

The complexity and fragility of the centralized approach cannot be eliminated by just training each of the assets 102, 104, 106 independently. For example, Q-independent learning trains each asset using regular Q-learning, while assuming that the other assets are a part of the environment. Since the other assets are also learning, the environment becomes non-stationary and the resulting instability has prevented these methods from working with more than two assets in simple settings.

Independent Learners with Centralized Training

RL methods that include independent learners with centralized training rely on access to a global state during training and a local state during execution for emergence of cooperation. Contrast this approach to learned inter-asset communication of embodiments which provides invariance to the number of assets. Learned communication can provide improved performance on the coverage and formation and can enable curriculum levels based on transfer learning.

In contrast, embodiments can include independent learners with learned communication. The assets 102, 104, 106 can learn what agents to include in communication, what data to share in the communication, and how to communicate the information. This communication can be learned using the technique 300.

There has been prior work on goal-oriented communication between two agents grounded in natural language. At least one other technique allows groups of agents to develop a communication without the constraint of natural language grounding. Such a technique can use multiple attention mechanisms and a differentiable communication protocol for an asset 102, 104, 106 to learn how and what to communicate. The invariance to the number of assets 102, 104, 106 can enable transfer learning of curricula.

In some cases, training time can be reduced with more assets 102, 104, 106 using transfer learning of curricula. Applications of embodiments can include courier dispatching (CD) where, given a number of couriers and unserved requests, decision are made to assign couriers to pick up requests that maximize the total revenue, ride hailing using mobile phones, delivery servicing to satisfy orders, and the like. In some embodiments, MARL with "delayed" matching between assets 102, 104, 106 and a target 110 can enable better solutions as an idle driver can enter the matching pool after the initial rider request. The concept of delayed matching can be applicable to any dynamic environment with time varying resources 309, such as in space, on land, in air, at sea, and in cyber domains. Each is discussed in turn.

Multi-agent actions taken in the space domain can require difficult orbital transfer calculations. The problem space becomes more complex when multiple satellites rendezvous with multiple targets synchronously while maintaining required distance from other satellites. In this setting, decision waypoints (nodes 128) can refer to the actual orbital transfer maneuver while motion waypoints can be preliminary phasing orbits. The difficulty of both computing and visualizing the solution favors the proposed approach of fast orbital calculations performed using a neural planner and decision points represented on the executive graph. MARL planning solutions can be confirmed using traditional approaches.

Consider a peer-to-peer satellite-refueling scenario in which an inner-ring of satellites is tasked with refueling an outer ring of satellites. It is a combinatorial problem not unlike the multi-agent navigation coverage problem where M assets coordinate to cover N targets. In general, the solution requires solving a non-linear programming problem that is computationally expensive and can have issues with convergence to local minima. As discussed above, the enumeration approach quickly becomes intractable even if each cooperative rendezvous pairing can be computed in a fraction of a nano-second. Unfortunately, the Hungarian algorithm is not applicable because of the non-linearities. The fast neural-planner combined with the executive graph MARL offers an alternative, valid solution.

Aerial obstructions can be seen and unseen. Mountains, thunderstorms, towers, and other vertical obstructions must be avoided. Unseen obstructions can include no-fly zones designated as such for various reasons. In military environments, threat domes around enemy surface-to-air (SAM) missile sites can be avoided. Regardless of the type of obstruction, it can be represented by a 3D point cloud and input into the path generation ML technique 120.

Figure 7:
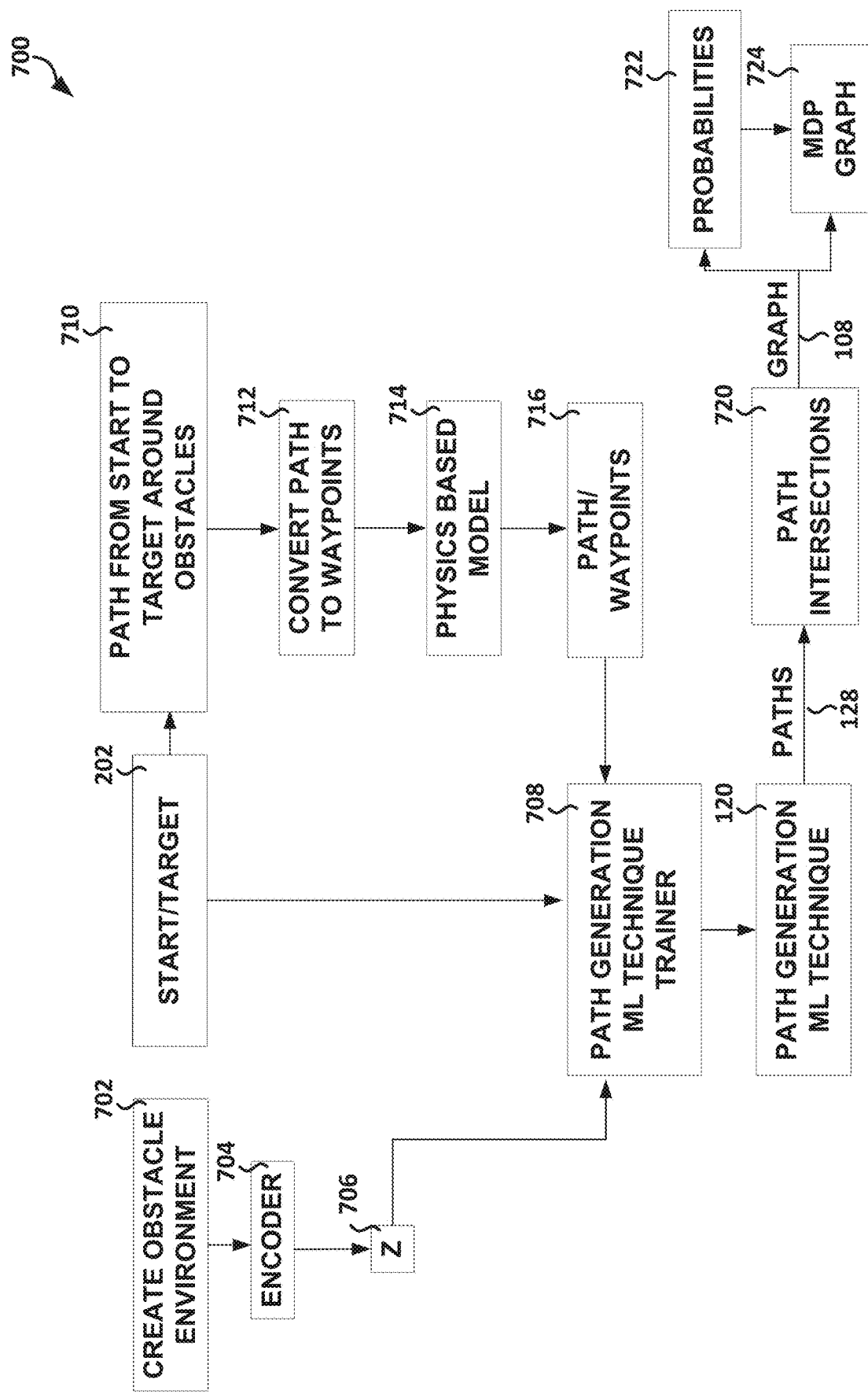
FIG. 7 illustrates, by way of example, a diagram of an embodiment of a neural planner training technique.

FIG. 7 illustrates, by way of example, a diagram of an embodiment of a neural planner training technique 700. The technique 700 as illustrated includes creating an obstacle environment at operation 702. The obstacle environment can include a 3D point cloud representation of the environment in which the asset 102, 104, 106 will operate. The obstacle environment 208, generated by operation 702 can be provided to an encoder 704. The encoder 704 can provide a latent space representation 706, Z, of the obstacle environment 208. The latent space representation 706 can be provided to a path generation ML technique trainer 708.

The start location and target 110 from operation 202 can be provided to the path generation ML technique trainer 708 and an operation 710 that determines a path from the start location to the target 110. The operation 710 can include using RRT, A*, or the like.

The path can be converted to motion and executive waypoints at operation 712. The conversion process finds all the intersections of all the paths from the path generation ML technique 120 The intersections in the paths can become decision waypoints (represents by nodes 128) in the decision graph 108. Multiple similar paths between decision waypoint nodes can be smoothed and combined based on a similarity threshold. The motion and executive waypoints can be provided to a physics-based model 204 of the asset 102, 104, 106 at operation 714. The operation 714 can select a path of the paths provided at operation 712 and provide a selected path/waypoints at operation 716 to the path generation ML technique trainer 708. The path/waypoints can be selected by a subject matter expert (SME) or a path selected from an advanced planning technique.

An example of training paths for the creation of the path generation ML technique 120 can include flight paths between start and stop waypoints generated using an aeronautical flight simulator. The waypoints which circumvent obstacles, can be obtained from an existing motion planner such as A*, or RRT or could be also be specified by a human subject matter expert (SME), such as a flight controller or pilot. After training, the path generation ML technique can replace the motion planner waypoints and the aeronautical flight simulator. The path generation ML technique 120 can have a speed of execution that is much faster and enable in-flight re-planning of many possible routes, which can then be converted into a decision node graph for an executive ML technique 124 to operate on and the motion ML technique 122 to move the asset 102, 104, 106 through.

The path generation ML technique trainer 708 can determine weights for NN nodes of the path generation ML technique 120. A loss function for determining the weights can include a difference between the path indicated at operation 716 and a path chosen by a partially trained version of the path generation ML technique 120. In experiments, a neural planner can be about 143 times faster than using state-of-the-art motion planner guided by a 6-DOF flight simulator.

The path generation ML technique 120 can generate paths (represented by edges 130) that are provided to an intersection operation 720 that determines intersections between paths. The intersections can become executive waypoints (e.g., nodes 128). The intersections can be determined by finding points on different paths that are below a specified distance apart. Such points can be considered decision points represented by nodes 128.

The graph 108 that includes the nodes 128 and paths can be combined with probabilities 722 to generate a Markov Decision Process (MDP) graph 724. Note that while embodiments consider the graph 724 an MDP graph, other decision processes can be used to determine how to navigate from a start to a target 110. MDP is just an example of such a decision that can be used with MARL.

The probabilities 722 are sometimes called Psuccess. Psuccess can be measured by propagating the assets 102, 104, 106 on the graph 108 and measuring the outcome of the fuel, time, and risk, or the like, the asset 102, 104, 106 incurred on the journey. A successful journey is one where the asset 102, 104, 106 reaches the goals without exceeding the constraints. For example, reaching the goal with enough remaining fuel to return home can be a success. Reaching the goal within some allotted deadline can be a success. Reaching the goal without incurring accumulated hazard over some threshold can be a success.

The Psuccess of an asset team can be determined by an aggregate outcome as measured by an overall number of goals attained and the overall costs incurred. The decision node graph 108 can enable emergent team behavior where some assets 102, 104, 106 can volunteer to be sacrificed for the greater good of the team. For example, the first asset 102, 104, 106 through a dangerous enemy route may not survive, but the other assets 102, 104, 106 that follow can survive due to the enemy being engaged with the first asset. Other emergent behaviors can include staging and queuing to for accessing shared resources such as airports or in-flight refueling tankers.

Many mission problems (targets 110) in a MARL setting can be multi-objective combinatorial optimization problems with constraints. For example, assigning assets 102, 104, 106 to targets 110 is a classic weapon-target pairing problem with sub-objectives to minimize risk, and multiple constraints 308, such as limited fuel and ordinance.

A typical air-training combat scenario can include aircraft tasked to reach various targets while avoiding threats such as Surface-to-Air Missiles (SAM). An in-mission change, such as a thunderstorm, new target, new threat, or new resource, such as a re-fueling tanker arriving. The trained assets 102, 104, 106 can respond appropriately if they are provided an updated set of safe waypoints or data indicating the obstacles in near real time.

Regarding land, Open Street Maps (OSM) includes maps organized as nodes 128 and ways (e.g., paths). A node 128 in OSM represents a specific point on the earth's surface defined by its latitude and longitude. Each node 128 can include at least an identification number and a pair of coordinates. Nodes 128 can also used to define the shape of a way. Nodes in the OSM map with multiple connections can be interpreted as decision waypoints for MARL.

In a water setting, the neural planner can be trained using a physics-based model of ship motion, which can include effects of wind and currents. The potential waterways can be joined together. The intersections form the nodes 128 in an MDP graph network. An example cooperative goal on water can be multiple vessels leaving one port node 128 to "cover" destination targets.

In a cyber setting, MARL can enable cooperative behavior of robot teams for many different applications, such as self-driving cars, and self-driving forklifts in smart factories. These applications can benefit from the asset policies independently learned using shared rewards which encourage meeting multiple objectives while satisfying multiple constraints.

Recent breakthroughs in deep net processing has shown the ability to compute solutions to physics-based problems, such as the three-body problem, many orders-of-magnitude faster than physics-based solutions. The following description regards a deep neural network trained on paths generated using a dynamic, physics-based model. The neural network can include an autoencoder. The neural network can be used in or as the path generation ML technique 120. The neural network can generate comparable routes much faster. The auto-generated routes can have the properties of a physics-based model without the computational burden of explicitly solving the dynamic equations. This result is useful for route planning and MARL purposes. In addition, the fast route planning capability can help improve real time operation situations, such as collision avoidance or fast dynamic targeting response.

Neural nets are capable of closely approximating any continuous function that describes the relationship between an outcome and a set of covariates. Once trained, a neural net has a predictable and fixed computational burden. Neural net emulation of complex physical systems offers predictable improvement in speed of computation.

Consider a scenario in which a weapon is instrumented to send position and orientation when the trigger is pressed. The trigger-press can signal a Mobile Edge Cloud (MEC) to compute the trajectory of an imaginary bullet fired from the weapon, including any interaction with a 3D environment. If the imaginary bullet strikes the intended target, a signal can be sent (from the MEC) to inform the recipient they have been hit similar to the popular laser-tag game. An advantage of the wireless approach over laser-tag is the MEC can compute realistic trajectory and effects of the projectile. Laser-tag can be defeated by a an object that blocks the laser beam.

The complex calculations of this scenario require significant skill in modeling physical phenomena to reach sufficient accuracy. Hypersonic Computational Fluid Dynamics (CFD) can be used to accurately model the flight of the imaginary bullet. Finite Element Analysis (FEA) can be used to model the imaginary bullet interaction with solid barriers, such as foliage. If the imaginary bullet emerges from the solid barrier, CFD can be used again to model the remaining path. If the bullet strikes the intended target, FEA can be used again to determine the severity of the impact.

The path generation ML technique 120 can offer a fast alternative to complex physical system modeling. Physical simulations can be used to create training datasets. This can be a one-time task performed by domain experts. The datasets can be used to train a deep neural network, such as an autoencoder. After training, a decoder part of the auto-encoder can provide an alternative to using the physics-based modeling code. The advantage of this approach is at least two-fold: 1) the neural network approach can be applied by those not versed in the intricacies of complex physical system modeling; and 2) the neural network decoder is much faster than the physic-based model (e.g., the neural network method is "faster-than-a-bullet"). Examples of the neural network approach include Newton's gravitational multi-body problem, and many other complex physical systems as described below.

Newton's equations of motion describe the evolution of many bodies in space under the influence of their own gravitational force. The equations have a central role in many classical problems in Physics. Over a fixed time interval, the three-body problem version of the many bodies problem can be solved by means of a feed-forward neural network (NN) consisting of 10 hidden layers of 128 interconnected nodes. A large training dataset can numerically integrate the equations of motion over a variety of initializations. The NN is up to 100-million times faster in predicting trajectory positions than another state-of-the-art solver. NNs can be used to solve problems of similar complexity by training the NN on the underlying physical processes.

A neural can emulate other physics-based simulations in other fields must faster than other techniques. Examples of physics-based simulations can include astrophysics, climate science, biogeochemistry, high energy density physics, fusion energy, and seismology, among others. The NN can be used to solve inverse problems as well. For example, the NN can find parameters that likely generated an observed signal. The NN can do this in less than one second using a single graphics processing unit (GPU). Non-NN simulations required about two days using thirty-two central processing unit (CPU) cores. The drastic improvement enables online diagnostics, real-time data interpretation, and on-the-fly intelligent automation. The NN can also provide an estimation of confidence regions to know expected accuracy of the NN approach.

Qureshi et al. describe a fast and near-optimal motion-planning network (MPNet) to compute collision free path through an obstacle point cloud in Qureshi, A. H., Simeonov, A., Bency, M. J. and Yip, M. C., "Motion planning networks," 2019 International Conference on Robotics and Automation (ICRA), 2118-2124, IEEE (2019). MPNet directly encodes a three-dimensional (3D) point cloud of an obstacle environment and can generate an end-to-end collision free path for a given start and target 110 configuration, such as can be provided at operation 202.

MPNet can be applied to a planning domain of interest. MPNet can be used to create the routes for MARL environments. MPNet is an example of an architecture that can be used to implement the path generation ML technique 120. The next section discusses the structure of MPNet.

MPNet

Figure 8:
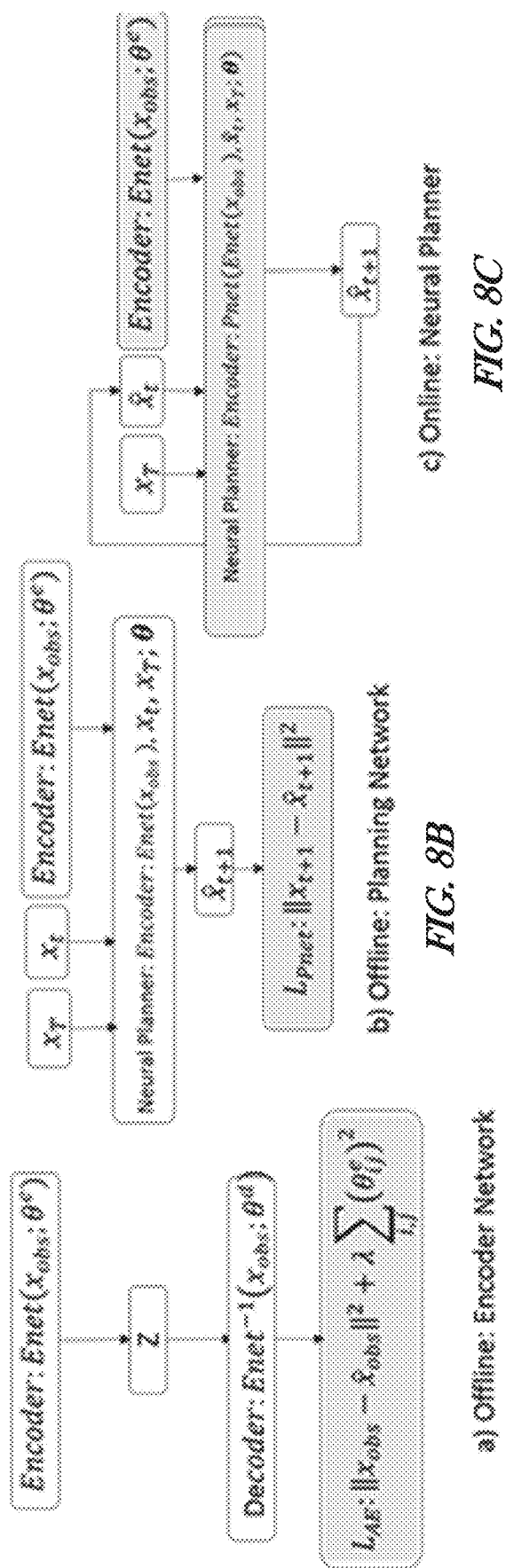
FIG. 8A illustrates, by way of example, a logical flow diagram of an embodiment of the offline phase of an encoder network of a neural planner.
FIG. 8B illustrates, by way of example, a logical flow diagram of an embodiment of the offline phase of a planning network of a neural planner.
FIG. 8C illustrates, by way of example, a logical flow diagram of an embodiment of the online phase of a neural planner.

FIG. 8A illustrates, by way of example, a logical flow diagram of an embodiment of the offline phase of an encoder network of MPNet. FIG. 8B illustrates, by way of example, a logical flow diagram of an embodiment of the offline phase of a planning network of MPNet. FIG. 8C illustrates, by way of example, a logical flow diagram of an embodiment of the online phase of MPNet (e.g., a neural planner). The Offline Encoder Network (Enet) in FIG. 8A embeds the obstacle point clouds, $x_{obs}$ into a latent space. The Offline Planning Network in FIG. 8B is a planning network (Pnet) which learns to do motion planning for the given obstacle embedding, start, and goal 310 configuration. The Online Neural Planner of FIG. 8C exploits the neural models from the offline phase to do motion planning in cluttered and complex environments. FIG. 8C shows the information flow from Enet to Pnet. The details of each block are described in more detail here.

Regarding FIG. 8A the Enet can be trained using encoder-decoder architecture with the reconstruction loss:

$$L_{AE} = \frac{1}{N_{obs}} \sum_{x \in D_{obs}} \|x_{obs} - \hat{x}_{obs}\|^2 + \lambda \sum_{i,j} (\theta^e_{i,j})^2,$$

Where $\theta^e$ are the parameters of the encoder, $\theta^d$ are the parameters of the decoder, $\lambda$ is a penalizing coefficient, $D_{obs}$ is a dataset of point clouds, $\hat{x}$ is the point cloud reconstructed by the decoder. A contractive autoencoder architecture can be used because it learns robust and invariant feature space required for planning and generalization to unseen 3D environments.

Regarding FIG. 8B, Pnet can include a feed-forward deep neural network, parameterized by $\theta$, to perform planning, given the obstacles encoding Z, current state $x_t$. Paths for training can come from human Subject Matter Experts (SMEs) or from paths created by advanced planning techniques. In either case, the training objective for the Pnet can include minimizing the mean-squared-error (MSE) loss between the predicted states $\hat{x}_{t+1}$ and the actual states $x_{t+1}$ given by the expert or physics-based path training data:

$$L_{Pnet}(\theta) = \frac{1}{N_p} \Sigma_j^{\hat{N}} \Sigma_{t=0}^{T-1} \|\hat{x}_{j,i+1} - x_{j,i+1}\|^2,$$

Where $N_p$ is the averaging term of total number of paths times path length, $\hat{N}$ is the total number of paths, T is the length of each path.

Regarding FIG. 8C, finding a collision-free path through a complex 3D point cloud can be challenging. In some cases, there may be no feasible solution due to complete blockage by obstacles. In other cases, the only feasible route may tortuously circuitous with many false box canyons. A few proposed techniques can be used to handle these difficulties: 1) call the neural planner and checks if it is feasible. If it is then the output can be simplified via lazy state contraction and returned. If the path is not feasible then a replanner can called. The replanner can iterate over all consecutive states in the path and checks if they are connectable. If they are not connectable, a new path can be generated between those states using either recursive neural planning, or a hybrid where a classical motion planning method can be used if the neural planner cannot find a feasible path. The neural planner can call Pnet using the inputted start, goal, and embedded obstacles, Z.

Figure 9:
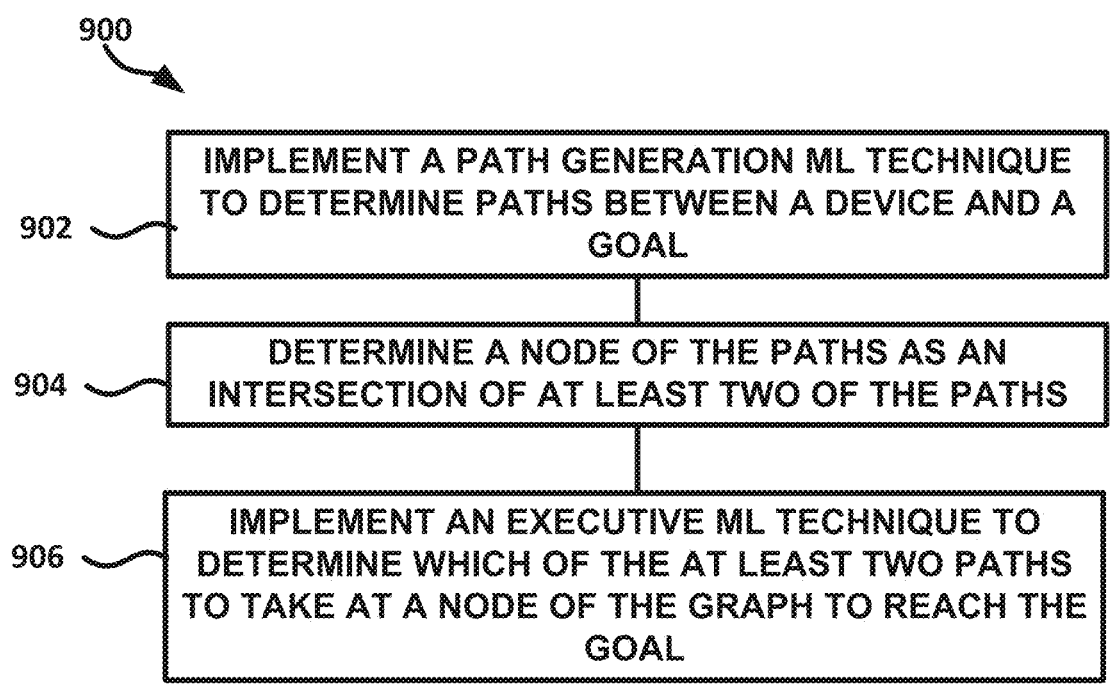
FIG. 9 illustrates, by way of example, a diagram of an embodiment of a method for improved autonomous scenario navigation.

FIG. 9 illustrates, by way of example, a diagram of an embodiment of a method 900 for autonomous, dynamic scenario navigation. The method 900 can be implemented using one or more of the components or operations of FIGS. 1-8. The method 900 as illustrated includes implementing a path generation ML technique 120 to determine paths between a device (e.g., an asset 102, 104, 106, and the goal 310), at operation 902; determining a node 128 of the paths as an intersection of at least two of the paths, at operation 904; and implementing an executive ML technique 124 to determine which of the at least two paths to take at a node 128 of the graph to reach the goal 310 (e.g., target 110), at operation 906.

The executive ML technique 124 can determine which path to take based on data representing a three-dimensional (3D) point cloud of an environment around the device. The method 900 can further include, wherein a density of the points in the 3D point cloud represent severity of risk to the device in traversing through that portion of the environment 408 represented by the 3D point cloud. The method 900 can further include, wherein the executive ML technique 124 includes a Markov Decision Process (MDP).

The method 900 can further include, wherein the executive ML technique 124 determines the path of the paths to take based the goal 310 and a reward 312 for reaching the goal 310. The executive ML technique 124 can determine the path of the paths to take based further on a reward 312 of a second device (e.g., the asset 102, 104, 106) and respective capabilities constraints of the device and the second device and the device and the second device share a common goal 310.

The method 900 can further include, wherein the path generation ML technique 120 operates using a neural planner. The method 900 can further include, wherein the path generation ML technique 120 is one of a plurality of path generation ML techniques, each of the path generation ML techniques trained based on a different constraints 309. The method 900 can further include, wherein the different constraints 309 include one or more of least fuel used in traversing the path, least time to traverse the path, or least damage to the device in traversing the path.

For more details regarding aspects of embodiments of path generation ML techniques please refer to Appendix A. For more details regarding aspects of embodiments of graph generation techniques or executive ML techniques please refer to Appendix B.

Figure 10:
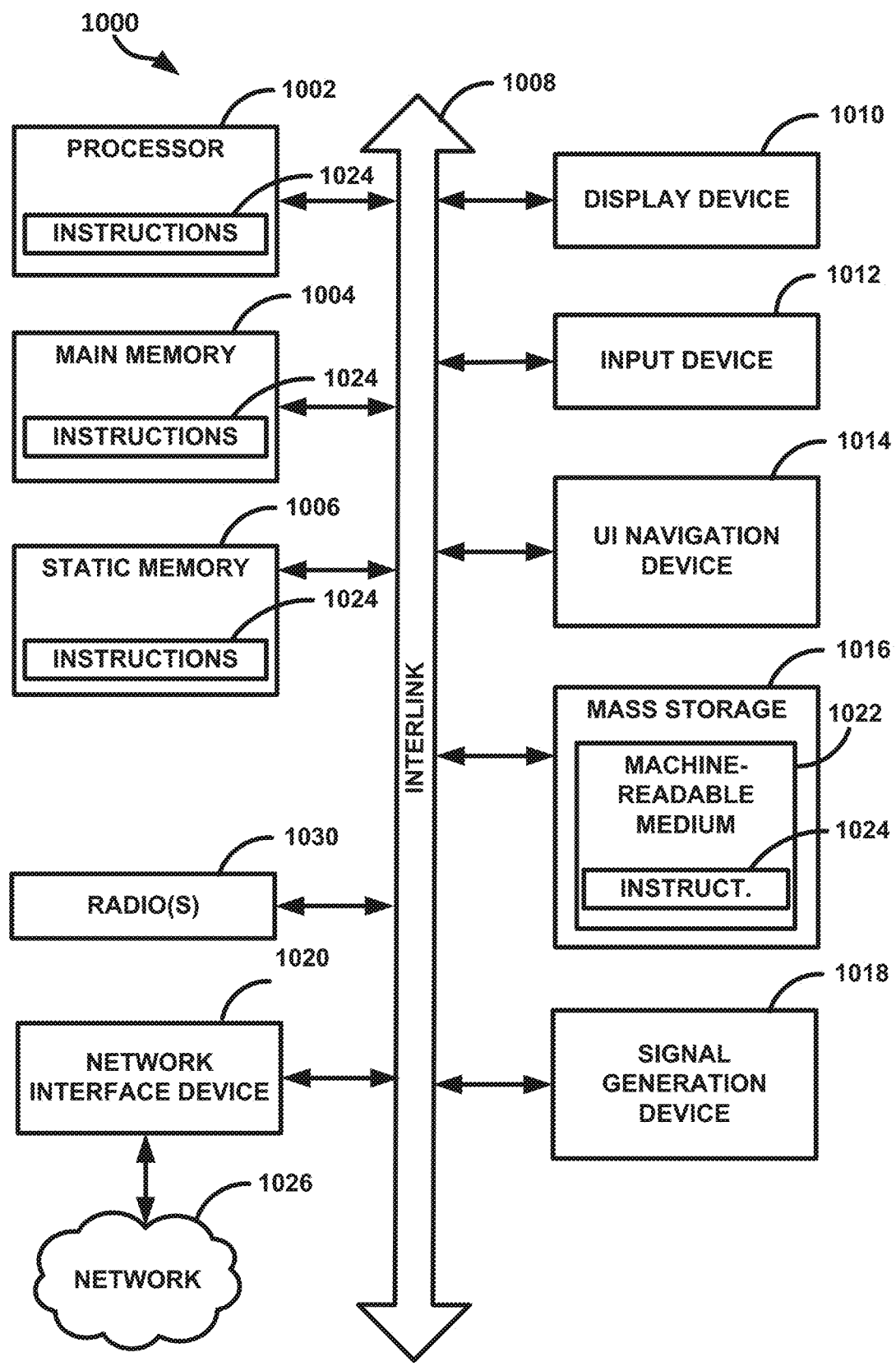
FIG. 10 illustrates, by way of example, a block diagram of an embodiment of a machine in the example form of a computer system within which instructions, for causing the machine to perform any one or more of the methodologies discussed herein, may be executed.

FIG. 10 illustrates, by way of example, a block diagram of an embodiment of a machine in the example form of a computer system 1000 within which instructions, for causing the machine to perform any one or more of the methodologies discussed herein, may be executed. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a user interface (UI) navigation device 1014 (e.g., a mouse), a mass storage unit 1016, a signal generation device 1018 (e.g., a speaker), a network interface device 1020, and a radio 1030 such as Bluetooth, WWAN, WLAN, and NFC, permitting the application of security controls on such protocols.

The mass storage unit 1016 includes a machine-readable medium 1022 on which is stored one or more sets of instructions and data structures (e.g., software) 1024 embodying or utilized by any one or more of the methodologies or functions described herein. The instructions 1024 may also reside, completely or at least partially, within the main memory 1004 and/or within the processor 1002 during execution thereof by the computer system 1000, the main memory 1004 and the processor 1002 also constituting machine-readable media.

While the machine-readable medium 1022 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 1024 may further be transmitted or received over a communications network 1026 using a transmission medium. The instructions 1024 may be transmitted using the network interface device 1020 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Additional Notes and Examples

Example 1 can include a device comprising at least one memory storing data of a path generation machine learning (ML) technique, an executive ML technique, and a goal, and processing circuitry configured to implement the path generation ML technique to determine paths between the device and a target, determine a node of the paths as an intersection of at least two of the paths, and implement the executive ML technique to determine which of the at least two paths to take at a node of the graphs to reach the goal.

In Example 2, Example 1 can further include, wherein the memory includes data representing a three-dimensional (3D) point cloud of an environment around the device, wherein a density of the points in the 3D point cloud represent severity of risk to the device in traversing through that portion of the environment represented by the 3D point cloud.

In Example 3, at least one of Examples 1-2 can further include, wherein the executive ML technique includes a Markov Decision Process (MDP).

In Example 4, Example 3 can further include, wherein the executive ML technique determines the path of the paths to take based on a defined goal and a reward.

In Example 5, Example 4 can further include, wherein the executive ML technique determines the path of the paths to take based further on a reward of a second device and respective capabilities constraints of the device and the second device. The first and second devices can share a common goal.

In Example 6, at least one of Examples 1-5 can further include, wherein the path generation ML technique operates using a neural planner.

In Example 7, at least one of Examples 1-6 can further include, wherein the path generation ML technique is one of a plurality of path generation ML techniques, each of the path generation ML techniques trained based on a different constraints.

In Example 8, Example 7 can further include, wherein the different constraints include one or more of least fuel used in traversing the path, least time to traverse the path, or least damage to the device in traversing the path.

Example 9 can include a method of performing operations of the processing circuitry of at least one of Examples 1-8.

Example 10 can include a machine-readable medium including instructions that, when executed by a machine, cause the machine to perform operation of the method of Example 9.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A device comprising:
  at least one memory storing data of a path generation machine learning (ML) technique, an executive multi-agent reinforcement learning (MARL) ML technique, a motion ML technique, and a goal associated with a target; and
  processing circuitry configured to:
    implement the path generation ML technique to determine multiple, distinct paths between the device and a target resulting in pre-determined paths that jointly form a graph, the path generation ML technique is constrained to generate a path of the pre-determined paths that is achievable based on a physics-based model of a vehicle and minimizes usage of a resource and then blocking that path to find an alternative path of the pre-determined paths that minimizes the usage of the resource;

determine a node of the pre-determined paths as an intersection of at least two paths of the pre-determined paths;

implement the executive MARL ML technique to determine which of the at least two pre-determined paths to take at a node of the graph to achieve the goal and reach the target resulting in a selected path; and implement the motion ML technique to cause the device to traverse the selected path.

2. The device of claim 1, wherein the memory includes data representing a three-dimensional (3D) point cloud of an environment around the device, wherein a density of the points in the 3D point cloud represent severity of risk to the device in traversing through that portion of the environment represented by the 3D point cloud.

3. The device of claim 1, wherein the executive ML technique includes a Markov Decision Process (MDP) and operates only to determine which path of the pre-determined paths to take at the node.

4. The device of claim 3, wherein the executive ML technique determines the selected path to take based on a defined goal and a reinforcement learning (RL) reward.

5. The device of claim 4, wherein the executive ML technique determines the selected path to take based further on a reinforcement learning (RL) reward of a second device and respective capabilities constraints of the device and the second device; and the goal is common to the first and second devices.

6. The device of claim 1, wherein the path generation ML technique operates using a neural planner.

7. The device of claim 1, wherein the path generation ML technique is one of a plurality of path generation ML techniques, each of the path generation ML techniques trained based on a different constraints.

8. The device of claim 7, wherein the different constraints include two or more of least fuel used in traversing the path, least time to traverse the path, or least damage to the device in traversing the path.

9. A method of navigating to a goal, the method comprising:

implementing a path generation machine learning (ML) technique to determine multiple, distinct paths between a device and the goal resulting in pre-determined paths that jointly form a graph, the path generation ML technique is constrained to generate a path of the pre-determined paths that is achievable based on a physics-based model of a vehicle and minimizes usage of a resource and then blocking that path to find an alternative path of the pre-determined paths that minimizes the usage of the resource;

determining a node of the pre-determined paths as an intersection of at least two paths of the pre-determined paths; and implementing an executive ML technique to determine which of the at least two pre-determined paths to take at a node of the graph to achieve the goal resulting in a selected path.

10. The method of claim 9, wherein the executive ML technique determines which pre-determined path to take based on data representing a three-dimensional (3D) point cloud of an environment around the device as input, wherein a density of the points in the 3D point cloud represent severity of risk to the device in traversing through that portion of the environment represented by the 3D point cloud.

11. The method of claim 9, wherein the executive ML technique includes a Markov Decision Process (MDP) and operates only to determine which path of the pre-determined paths to take at the node.

12. The method of claim 11, wherein the executive ML technique determines the pre-determined path of the pre-determined paths to take based the goal and a reinforcement learning (RL) reward for reaching the goal.

13. The method of claim 11, wherein the executive ML technique determines the pre-determined path of the pre-determined paths to take based further on an RL reward of a second device and respective capabilities constraints of the device and the second device and the goal is shared between the device and the second device.

14. The method of claim 9, wherein the path generation ML technique operates using a neural planner.

15. A machine-readable medium including instructions that, when executed by a machine, cause the machine to perform operations for navigating to a goal, the operations comprising:

implementing a path generation machine learning (ML) technique to determine multiple, distinct paths between a device and the goal resulting in pre-determined paths that jointly form a graph, the path generation ML technique is constrained to generate a path of the pre-determined paths that is achievable based on a physics-based model of a vehicle and minimizes usage of a resource and then blocking that path to find an alternative path of the pre-determined paths that minimizes the usage of the resource;

determining a node of the pre-determined paths as an intersection of at least two paths of the pre-determined paths; and implementing an executive ML technique to determine which of the at least two pre-determined paths to take at a node of the graph to achieve the goal resulting in a selected path.

16. The machine-readable medium of claim 15, wherein the executive ML technique determines which pre-determined path to take based on data representing a three-dimensional (3D) point cloud of an environment around the device as input, wherein a density of the points in the 3D point cloud represent severity of risk to the device in traversing through that portion of the environment represented by the 3D point cloud.

17. The machine-readable medium of claim 16, wherein the executive ML technique includes a Markov Decision Process (MDP) and the path generation ML technique includes a neural planner and operates only to determine which path of the pre-determined paths to take at the node.

18. The machine-readable medium of claim 15, wherein the executive ML technique determines the selected path of the pre-determined paths to take based the goal and a reinforcement learning (RL) reward for reaching the goal.

19. The machine-readable medium of claim 15, wherein the path generation ML technique is one of a plurality of path generation ML techniques, each of the path generation ML techniques trained based on a different constraints.

20. The machine-readable medium of claim 19, wherein the different constraints include two or more of least fuel used in traversing the path, least time to traverse the path, or least damage to the device in traversing the path.

* * * * *